Sept. 4, 1956 G. D. BROWN 2,761,696
VEHICLE WHEEL SUSPENSION OF THE KNEE ACTION
TYPE WITH CROSSED SUPPORTING ARMS
Filed Dec. 23, 1953 2 Sheets-Sheet 1
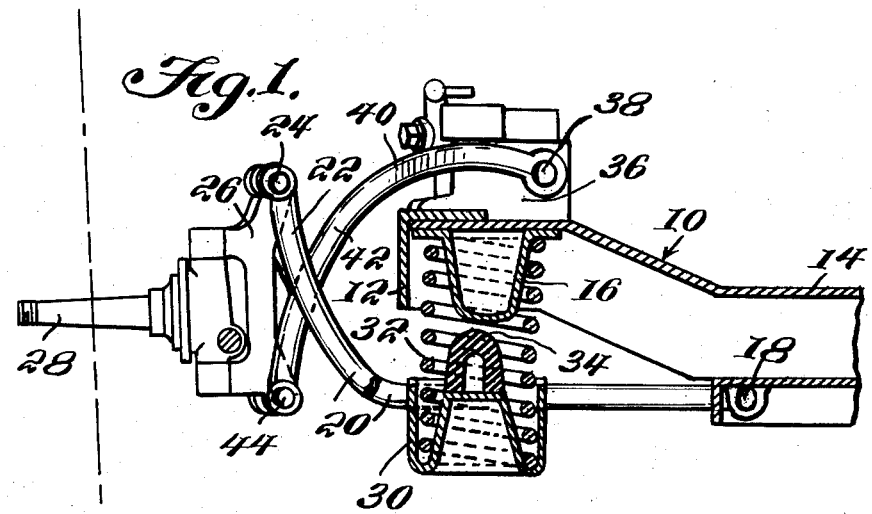
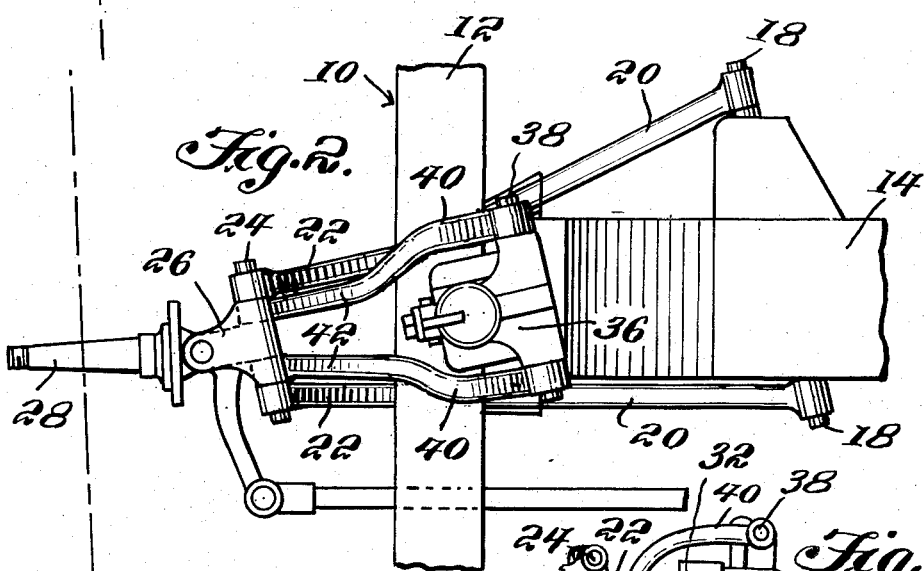
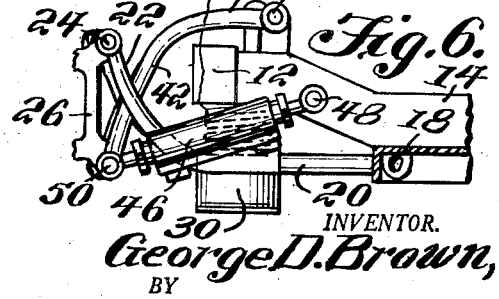
INVENTOR.
George D. Brown,
BY
McMorrow, Berman + Davidson
ATTORNEYS

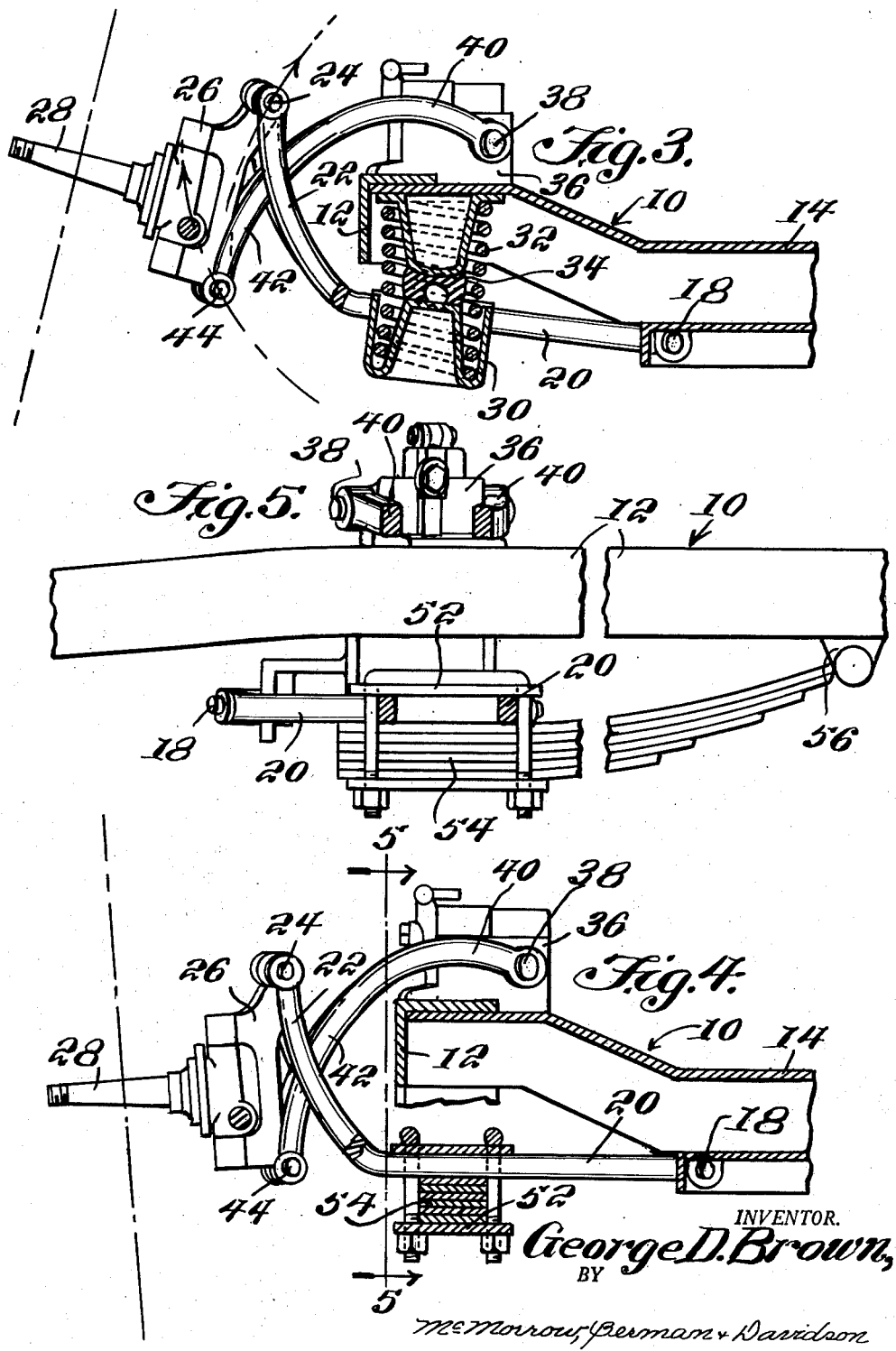

United States Patent Office 2,761,696
Patented Sept. 4, 1956

2,761,696

VEHICLE WHEEL SUSPENSION OF THE KNEE ACTION TYPE WITH CROSSED SUPPORTING ARMS

George Duane Brown, Berkley, Mich.

Application December 23, 1953, Serial No. 399,913

4 Claims. (Cl. 280—96.2)

This invention relates to a vehicle wheel suspension and more particularly to a wheel suspension of the knee action type.

The primary object of the invention is to stabilize a moving vehicle while it is rounding a curve at high speed.

Another object is to counteract the tendency of the outside wheel of the vehicle to fold inwardly under the vehicle when rounding a curve.

Still another object is to apply the benefits of this invention to a conventional knee action spring suspension with but a minimum of effort and by the simple substitution of my improved control arms for the control arms conventionally used in wheel suspensions of the knee action type.

The above and other objects may be attained by employing this invention which embodies among its features lower control arms carried by the cross member of a conventional vehicle frame for movement in arcuate paths adjacent opposite sides of the frame, springs carried by the lower control arms and operatively engaging the frame for yieldingly supporting said frame on the control arms, steering knuckles pivotally connected adjacent their upper ends to the lower control arms for movement in vertical arcuate paths adjacent the ends of said control arms remote from the frame, wheel spindles carried by the steering knuckles and extending outwardly therefrom adjacent opposite sides of the frames, upper control arms carried by the frame above the springs to move in vertical arcuate paths on opposite sides of the frame, said upper control arms being pivotally connected to the steering knuckles adjacent the lower ends thereof whereby as the frame moves against the effort of a spring, the spindle adjacent thereto will be moved outwardly at its lower end and inwardly at its upper end in respect to the frame.

Other features include double acting shock absorbers connected to the cross member above the lower control arm and adjacent their opposite ends to the steering knuckles adjacent the lower ends thereof.

In the drawings:

Figure 1 is an enlarged fragmentary sectional view through a vehicle frame showing this improved spring suspension applied thereto;

Figure 2 is a top plan view of the structure illustrated in Figure 1;

Figure 3 is a view similar to Figure 1, showing the spring of the spring suspension partially compressed and the relative position of the parts when the vehicle is rounding a curve at high speed;

Figure 4 is a fragmentary sectional view through the vehicle frame similar to Figure 1, showing a different type of suspension spring;

Figure 5 is a sectional view taken substantially on the line 5—5 of Figure 4; and Figure 6 is a fragmentary detail view showing a double acting shock absorber connected to the frame and a steering knuckle.

Referring to the drawings in detail, a vehicle frame designated generally 10 including spaced parallel side bars 12 is provided adjacent its forward end with a conventional cross member 14 carrying beneath each end and beneath an adjacent side bar 12 a conventional depending lug 16 defining a spring guide for the upper end of a conventional coil spring such as is commonly used in the spring suspension of the knee action type.

Pivoted as at 18 to the cross bar 14 adjacent each end thereof for movement in a vertical arcuate path beneath an adjacent side bar 12 of the frame 10 is a lower control arm 20 carrying adjacent its end remote from the pivot connection 18 an upwardly and outwardly extending extension 22 which moves in a vertical arcuate path adjacent its respective side of the vehicle and is pivotally connected as at 24 to a conventional steering knuckle 26 carrying an outwardly extending wheel spindle 28. It is to be noted that the extension 22 is pivotally connected to the steering knuckle 26 adjacent the upper end thereof. Carried by each control arm 20 below the side bar 12 of its respective frame member and in alignment with the downwardly extending guide lug 16 is a spring seat 30 carrying a conventional compression coil spring 32 through which the weight of the vehicle is yieldingly transmitted to the spring seat 30 and thence to the lower control arm 20. A conventional buffer 34 is seated on the upper end of the upwardly extending boss of the spring seat 30 and in the path of movement of the upper boss 16 so that as the frame 10 approaches a lower control arm 20, the buffer 34 will be compressed, as illustrated in Figure 3.

Carried by the frame 10 and extending upwardly therefrom above the opposite ends of the cross member 14 are brackets 36 to which are pivotally connected as at 38 upper control arms 40 which are provided with downwardly curved extensions 42, the lower ends of which are pivotally connected as at 44 to the steering knuckles 26 adjacent the lower ends thereof, below the horizontal plane in which lies the pivot axis 38.

In the preferred form of the invention, a suitable double acting shock absorber 46 is connected as at 48 to the cross member 14 adjacent each end thereof, and the opposite end of each shock absorber 46 is coupled as at 50 to the lower end of the adjacent steering knuckle 26.

The pivotal connections 24, 44 respectively lie (see Figure 1) approximately in the horizontal planes in which the pivot axes 38, 18 are disposed.

In the modified form of the invention, illustrated in Figures 4 and 5, the frame 10 is constructed identically with the frame previously described and the control arms 20 and 40 are coupled in the same manner to the frame, the only difference between the two structures is that in place of the spring seat 30 carried by the control arm 20, a clamp 52 is carried by the control arm 20 and supports one end of a conventional leaf spring 54 which is connected to adjacent side member of the frame 10 by a conventional bracket 56. It will be understood that there is a spring 54 for each side member 12 of the frame 10 and each spring is supported on the lower control arm 20 on each side of the cross member 14.

In use, it will be evident that as a vehicle equipped with this invention rounds a turn at high speed, and the body of the vehicle tends to roll outwardly on the curve, the spring 32 on the outer side of the curve will be compressed so that the lower control arm 20 tends to pull the upper end of the steering knuckle 26 inwardly, while the upper control arm 40 tends to move the lower end of the steering knuckle outwardly with the result that the wheel spindle 28 carried by the steering knuckle will tend to move in an arc which causes its outer end to move upwardly, as suggested in Figure 3, thereby in effect widening the tread of the vehicle in a manner to counteract the effort of the vehicle to roll over.

By thus employing this invention, greater stability to motor vehicles is achieved and the dangers ordinarily encountered in the driving of a motor vehicle at a high speed will be eliminated.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a vehicle wheel suspension of the knee action type a vehicle frame, a lower control arm pivotally connected at one end to a side of the frame to swing about a horizontal axis, for movement of its other end in a vertical arcuate path adjacent said side, means interposed between the arm and frame yieldingly and resiliently supporting said frame on the arm, an approximately vertical steering knuckle pivotally connected at its upper end to said other end of the lower control arm above a horizontal plane in which said axis lies, a wheel spindle carried by the steering knuckle and extending therefrom outwardly in respect to the frame, and an upper control arm pivotally connected at one end to the frame to swing about a horizontal axis, for movement of its other end in a vertical arcuate path, said upper control arm being pivotally connected at its other end to the lower end of the steering knuckle below a horizontal plane in which the second named axis lies.

2. In a vehicle wheel suspension of the knee action type a vehicle frame, a lower control arm pivotally connected at one end to a side of the frame to swing about a horizontal axis, for movement of its other end in a vertical arcuate path adjacent said side, means interposed between the arm and frame yieldingly and resiliently supporting said frame on the arm, an approximately vertical steering knuckle pivotally connected at its upper end to said other end of the lower control arm above a horizontal plane in which said axis lies, a wheel spindle carried by the steering knuckle and extending therefrom outwardly in respect to the frame, and an upper control arm pivotally connected at one end to the frame to swing about a horizontal axis, for movement of its other end in a vertical arcuate path, said upper control arm being pivotally connected at its other end to the lower end of the steering knuckle below a horizontal plane in which the second named axis lies, the plane of the first named axis being disposed below the plane of the second named axis.

3. In a vehicle wheel suspension of the knee action type a vehicle frame, a lower control arm pivotally connected at one end to a side of the frame to swing about a horizontal axis, for movement of its other end in a vertical arcuate path adjacent said side, means interposed between the arm and frame yieldingly and resiliently supporting said frame on the arm, an approximately vertical steering knuckle pivotally connected at its upper end to said other end of the lower control arm above a horizontal plane in which said axis lies, a wheel spindle carried by the steering knuckle and extending therefrom outwardly in respect to the frame, and an upper control arm pivotally connected at one end to the frame to swing about a horizontal axis, for movement of its other end in a vertical arcuate path, said upper control arm being pivotally connected at its other end to the lower end of the steering knuckle below a horizontal plane in which the second named axis lies, the plane of the first named axis being disposed below the plane of the second named axis, said other end of the lower control arm terminating approximately in the plane of the axis of the upper control arm and said other end of the upper control arm terminating approximately in the plane of the axis of the lower control arm.

4. In a vehicle wheel suspension of the knee action type a vehicle frame, a lower control arm pivotally connected at one end to a side of the frame to swing about a horizontal axis, for movement of its other end in a vertical arcuate path adjacent said side, means interposed between the arm and frame yieldingly and resiliently supporting said frame on the arm, an approximately vertical steering knuckle pivotally connected at its upper end to said other end of the lower control arm above a horizontal plane in which said axis lies, a wheel spindle carried by the steering knuckle and extending therefrom outwardly in respect to the frame, and an upper control arm pivotally connected at one end to the frame to swing about a horizontal axis, for movement of its other end in a vertical arcuate path, said upper control arm being pivotally connected at its other end to the lower end of the steering knuckle below a horizontal plane in which the second named axis lies, the plane of the first named axis being disposed below the plane of the second named axis, said other end of the lower control arm terminating approximately in the plane of the axis of the upper control arm and said other end of the upper control arm terminating approximately in the plane of the axis of the lower control arm, said arms being rigidly constituted from end to end thereof.

References Cited in the file of this patent

UNITED STATES PATENTS

| | | |
|---|---|---|
| 2,123,089 | Leighton | July 5, 1938 |
| 2,154,569 | Hicks | Apr. 18, 1939 |
| 2,299,935 | Stack et al. | Oct. 27, 1942 |